(12) United States Patent
Hasan

(10) Patent No.: US 8,948,009 B1
(45) Date of Patent: Feb. 3, 2015

(54) DEADLINE AWARE NETWORK PROTOCOL

(75) Inventor: Jahangir Hasan, San Jose, CA (US)

(73) Assignee: Google Inc., Mountain View, CA (US)

( * ) Notice: Subject to any disclaimer, the term of this patent is extended or adjusted under 35 U.S.C. 154(b) by 225 days.

(21) Appl. No.: 13/472,424

(22) Filed: May 15, 2012

(51) Int. Cl.
*H04L 1/00* (2006.01)
*H04L 12/26* (2006.01)
*G06F 15/16* (2006.01)
*H04L 12/801* (2013.01)

(52) U.S. Cl.
CPC ............ *H04L 47/193* (2013.01); *H04L 47/127* (2013.01)
USPC ........... 370/231; 370/232; 370/235; 709/230; 709/231; 709/232

(58) Field of Classification Search
CPC ..... H04L 47/193; H04L 47/27; H04L 47/127; H04L 47/19; H04L 47/10; H04L 47/12; H04L 47/30; H04L 47/00
USPC .................. 370/229, 231, 232, 233, 234, 235; 709/230, 231, 232
See application file for complete search history.

(56) References Cited

U.S. PATENT DOCUMENTS

| | | | |
|---|---|---|---|
| 6,694,488 B1 | 2/2004 | Raghunathan et al. | |
| 6,975,629 B2 | 12/2005 | Welin | |
| 7,047,312 B1 * | 5/2006 | Aweya et al. | ................. 709/235 |
| 7,054,317 B1 | 5/2006 | Jung et al. | |
| 7,602,719 B2 | 10/2009 | Speight et al. | |
| 7,912,911 B2 | 3/2011 | Way et al. | |
| 2004/0136370 A1 * | 7/2004 | Moore et al. | ................. 370/389 |
| 2008/0089230 A1 | 4/2008 | Kootstra | |
| 2010/0085887 A1 | 4/2010 | Ray et al. | |
| 2010/0205310 A1 | 8/2010 | Altshuler et al. | |

OTHER PUBLICATIONS

Leiserson, "Fat-Trees: Universal Networks for Hardware-Efficient Supercomputing", Oct. 1985, IEEE, all pages.*
Ramakrishnan, "The Addition of Explicit Congestion Notification (ECN) to IP", Sep. 2001, The Internet Society, all pages.*
Wilson, Christo, et al., "Better Never than Late: Meeting Deadlines in Datacenter Networks," Microsoft Research, Cambridge, UK, Published Aug. 4, 2011 for ACM SIGCOMM'11 vol. 41 Issue 4.

* cited by examiner

*Primary Examiner* — Kwang B Yao
*Assistant Examiner* — Adam Duda
(74) *Attorney, Agent, or Firm* — Foley & Lardner LLP; Edward A. Gordon

(57) ABSTRACT

Systems and techniques for prioritizing network traffic based on a flow deadline are presented. Data bandwidth in a network is detected. In response to congestion in the network, a transmission control protocol (TCP) window size is reduced. The TCP window size is reduced based on time remaining until the flow deadline. In one example, the TCP window size if further reduced based on a degree of congestion in the network. In response to no congestion in the network, the TCP window size is increased by a predetermined amount.

23 Claims, 12 Drawing Sheets

DEADLINE AWARE NETWORK PROTOCOL

TECHNICAL FIELD

This disclosure relates generally to networking, and more specifically, to prioritizing network traffic based on deadlines.

BACKGROUND

Datacenters are emerging as critical platforms for ever-growing online services. As a result, datacenters are required to handle a greater amount of network traffic. The large volume of data in a datacenter network is typically distributed over thousands of servers. In conventional datacenter networks, all network traffic is treated equally. Therefore, when there is a network condition that affects network traffic (e.g., increased network congestion), flow of all data in the network is reduced by an equal amount. Furthermore, datacenter applications are often driven by deadlines. A missed deadline can adversely affect, for example, search quality in a Web Search application. However, conventional datacenter networks are unaware of deadlines for network traffic. As a result, deadlines are often missed and/or network performance is reduced in conventional datacenter networks.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a congestion detection component and a modification component. The congestion detection component detects data bandwidth in a network. The modification component modifies a transmission control protocol (TCP) window size. The TCP window size is reduced in response to congestion in the network based on time remaining until a flow deadline. In one example, the TCP window size is further reduced based on a degree of the congestion in the network.

Additionally, a non-limiting implementation provides for detecting data bandwidth in a network, reducing a transmission control protocol (TCP) window size in response to congestion in the network, and increasing the TCP window size in response to no congestion in the network. A degree of reduction of the TCP window size is based on time remaining until a flow deadline. In one example, the degree of reduction of the TCP window size is further based on a degree of congestion in the network.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
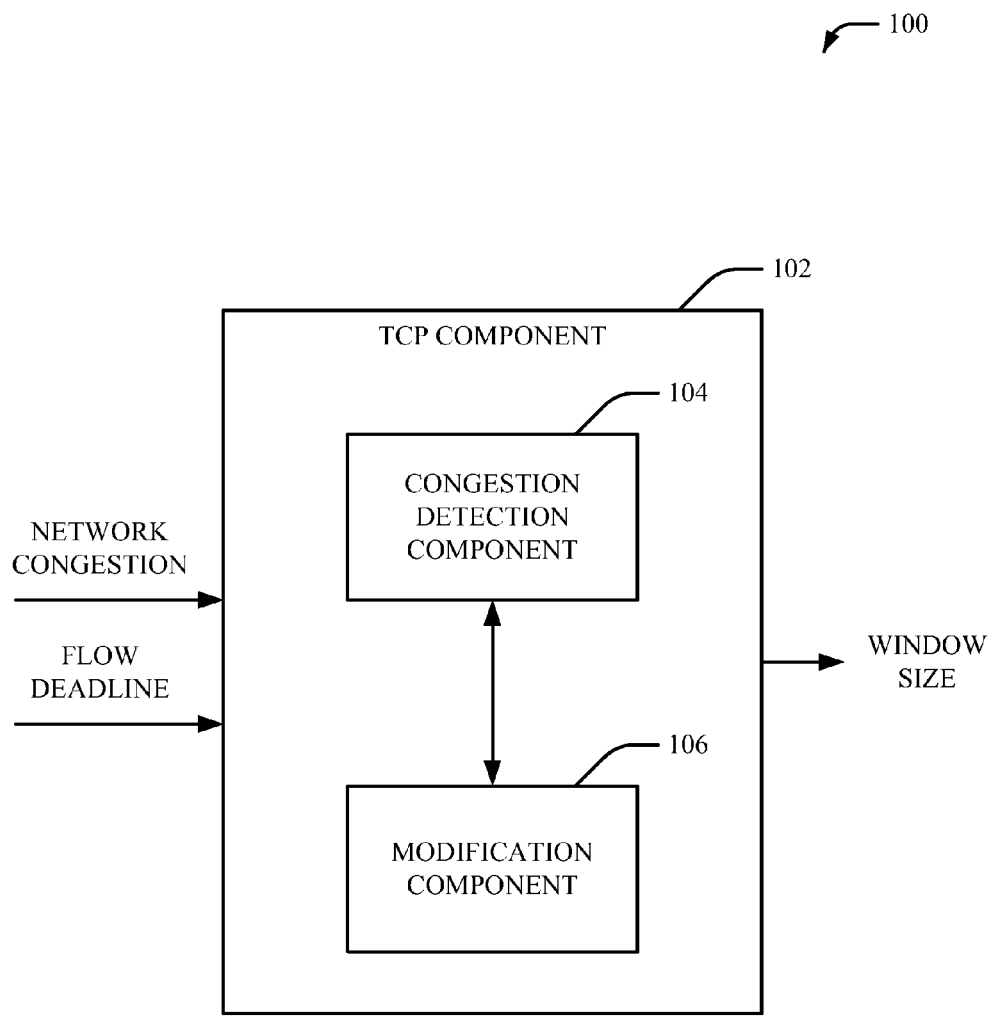
FIG. 1 illustrates a high-level block diagram of an example transmission control protocol (TCP) component, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Datacenter networks are emerging as critical platforms for ever-growing online services (e.g., online applications). As a result, datacenter networks are required to handle a greater amount of network traffic. The large volume of data in a datacenter network is typically distributed over thousands of servers. In conventional datacenter networks, all network traffic is treated equally (e.g., window size is adjusted based on a constant congestion penalty). Therefore, when there is a network condition that affects network traffic (e.g., increased network congestion), the window size for all data in the network is reduced by an equal amount. Furthermore, datacenter applications (e.g., network traffic) are often driven by deadlines (e.g., flow deadlines, data packet deadlines, etc.). A missed deadline can adversely affect, for example, search quality in a Web Search application. However, conventional datacenter networks are unaware of deadlines for network traffic. As a result, deadlines are often missed and/or network performance is reduced (e.g., negatively affected) in conventional datacenter networks.

To that end, techniques for prioritizing traffic in a network based on deadlines are presented. For example, a network can implement a deadline-aware transmission control protocol (TCP). Systems and methods disclosed herein relate to prioritizing network traffic (e.g., network data flows) based on deadlines using circuitry and/or instructions stored or transmitted in a computer readable medium. For example, window size (e.g., data send rate) can be modified based on current network congestion and a flow deadline (e.g., a data packet deadline). When a sender (e.g., a send component in a network) detects network congestion and the flow deadline is impending (e.g., below a predetermined time threshold), the window size can be reduced by a small degree or not at all. However, when a sender detects network congestion and the flow deadline is far away (e.g., above a predetermined time threshold), the window size can be reduced by a greater degree. Therefore, network traffic can be prioritized through a network based on the deadlines (e.g., priority can be given to a data flow with a close deadline). As such, fewer deadlines are missed, tighter deadlines can be met and/or network performance can be improved.

Referring initially to FIG. 1, there is illustrated an example system 100 that implements a deadline-aware transport protocol, according to an aspect of the subject disclosure. The system 100 can be implemented in a TCP environment. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

Specifically, the system 100 can provide a TCP component with a congestion detection feature (e.g., congestion detection component 104) and a modification feature (e.g., modification component 106) that can be utilized in most any networking application. The congestion detection feature can detect data bandwidth in a network. The modification feature can modify (e.g., reduce) a TCP window size in response to congestion in the network. The TCP window size can be reduced based on time remaining until a flow deadline an/or a degree of congestion in the network. The system 100 can be employed by various systems, such as, but not limited to data center systems, network systems, computer network systems, communication systems, router systems, server systems, high availability server systems (e.g., Telecom server systems), Web server systems, file server systems, media server systems, disk array systems, powered insertion board systems, and the like. In this application, a network may be any network that uses network protocols such as TCP/IP, including, but not limited to, Open Flow Networks.

In particular, the system 100 can include a TCP component 102. In one example, the TCP component 102 can be implemented as a deadline-aware TCP component. The TCP component 102 can be implemented in a sender (e.g., a sender device). In FIG. 1, the TCP component 102 includes a congestion detection component 104 and a modification component 106. The TCP component 102 can receive a network congestion signal (e.g., NETWORK CONGESTION shown in FIG. 1) and a flow deadline signal (e.g., FLOW DEADLINE shown in FIG. 1). The network congestion signal can include the degree of congestion in the network. The flow deadline signal can include the time remaining until a deadline for a flow (e.g., a data packet). The network congestion signal and/or the flow deadline signal can include condition feedback from the network. In response to the network congestion signal and the flow deadline signal, the TCP component 102 can generate a window size signal (e.g., WINDOW SIZE shown in FIG. 1). For example, the window size signal can include a new window size for a flow.

The congestion detection component 104 can detect (or be configured to detect) data bandwidth in a network. For example, the congestion detection component 104 can receive and/or process the network congestion signal. In one example, the congestion detection component 104 can implicitly infer network congestion by detecting packet loss. In another example, the congestion detection component 104 can receive one or more explicit congestion notifications (e.g., from a switch). As such, the congestion detection component 104 can determine the degree of congestion in the network (e.g., whether there is congestion in the network).

The modification component 106 can modify (or be configured to modify) a TCP window size (e.g., a congestion window size) in response to detected congestion in the network. For example, the TCP window size can be reduced in response to detected congestion in the network. The TCP window size can specify the number of bytes that a receiver (e.g., a receiver component) can receive and/or the number of bytes a sender (e.g., a sender device) can send. The TCP window size can be modified (e.g., reduced) based on a degree of network congestion and/or time remaining until a flow deadline. For example, if the congestion detection component 104 detects network congestion and a flow deadline is impending (e.g., near), then the modification component 106 can reduce the TCP window size by a certain amount (e.g., a small degree) or the modification component 106 can maintain the current TCP window size. If the congestion detection component 104 detects network congestion and a flow deadline is far away, then the modification component 106 can reduce the TCP window size by a greater amount (e.g., a greater degree). The amount of reduction to the TCP window can be based at least in part on the degree of congestion in the network. Therefore, the TCP window size can be adjusted (e.g., reduced) by an amount that is proportional to the time remaining until a flow deadline and/or the degree of congestion in the network. As such, the TCP window size can be modulated in a deadline-aware manner. In response to no detected congestion in the network, the modification component 106 can increase the TCP window size by a predetermined amount (e.g., by one segment).

While FIG. 1 depicts separate components in system 100, it is to be appreciated that the components may be implemented in a common component. In one example, the congestion detection component 104 and the modification component 106 can be included in a single component. Further, it can be appreciated that the design of system 100 can include other component selections, component placements, etc., to implement a deadline-aware network protocol.

Figure 2:
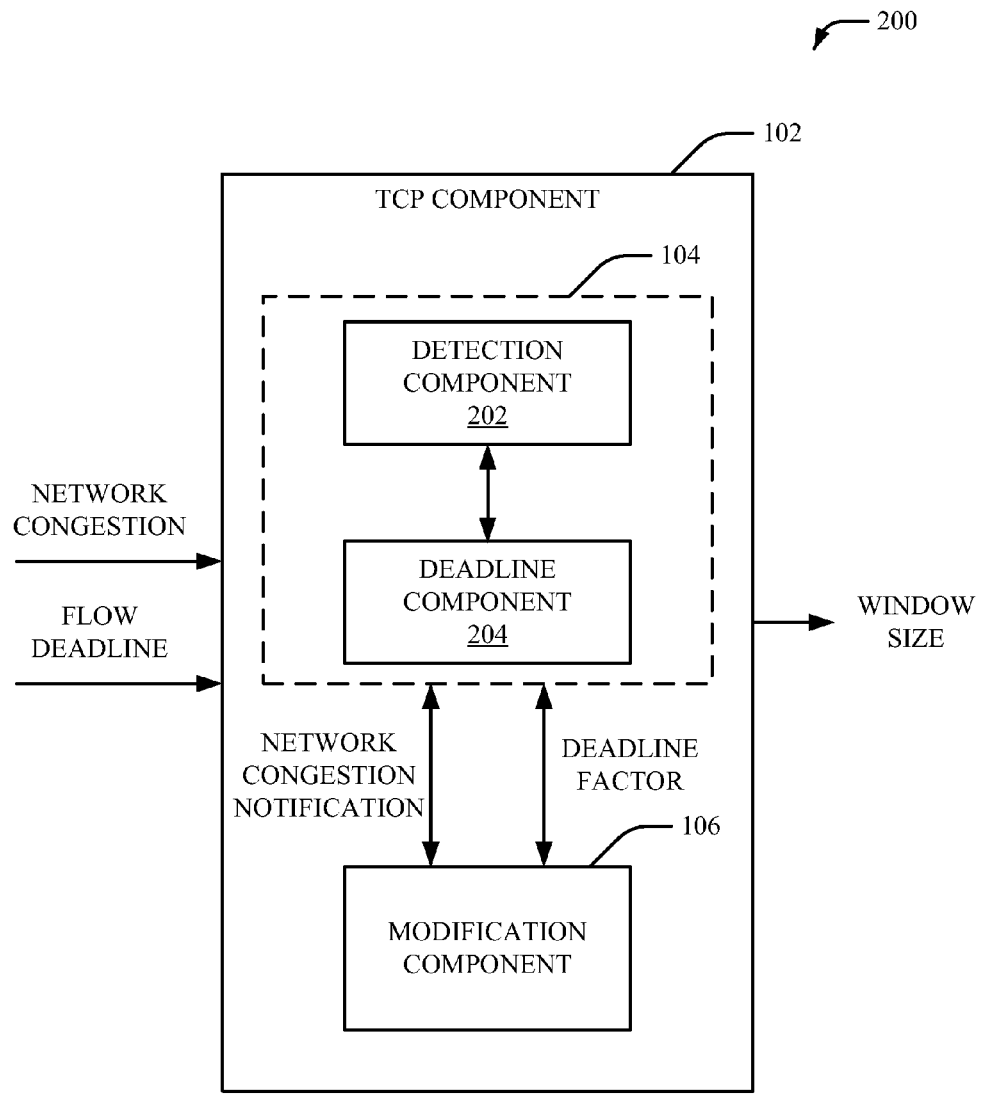
FIG. 2 illustrates a high-level block diagram of a detection component and a deadline component in an example TCP component, in accordance with various aspects and implementations described herein.

Referring now to FIG. 2, there is illustrated a non-limiting implementation of a system 200 in accordance with various aspects and implementations of this disclosure. The system 200 includes the TCP component 102. The TCP component 102 includes the congestion detection component 104 and the modification component 106. The congestion detection component 104 includes a detection component 202 and a deadline component 204.

The detection component 202 can detect data bandwidth in a network. For example, the detection component 202 can utilize explicit congestion notification (ECN) feedback. For example, a TCP header can provide the ECN feedback (e.g., one or more bits can be set in the TCP header). The detection component 202 can average ECN bits to detect the congestion. The detection component 202 can generate a network congestion notification (e.g., NETWORK CONGESTION NOTIFICATION shown in FIG. 2). The network congestion notification can include the degree of congestion in the network. For example, the degree of congestion can be determined as the fraction of packets with ECN bits set. The network congest notification can include, but is not limited to, an ECN, a duplicate acknowledgement signal or a packet error loss signal. In another example, the detection component 202 can receive one or more congestion notifications (e.g., from a switch). For example, one or more congestion notifications can be received (e.g., generated by a switch) in response to congestion in the network (e.g., in response to congestion in the network exceeding a predetermined level).

The deadline component 204 can generate a deadline imminence factor (e.g., DEADLINE FACTOR shown in FIG. 2). A larger deadline imminence factor can correspond to a closer deadline. The deadline imminence factor can be determined based the amount of time need for a flow to complete transmission of all of the data (T_c) and the remaining time until a flow deadline (D).

For example, the deadline imminence factor (d) can be calculated using the following equation:

$$d = \frac{T\_c}{D}$$

As such, the amount of adjustment (e.g., reduction) to a TCP window can be based at least in part on the value of the calculated deadline imminence factor (e.g., the size of the TCP window can be reduced based at least in part on the value of the deadline imminence factor). The time for a flow to complete transmitting all of the data (T_c) can be calculated using the following equations:

$$T\_c = \frac{B}{\frac{3W}{4} - \frac{1}{2}}, \text{ for } T\_c > L$$

$$T\_c = -\frac{W-1}{2} + \sqrt{1/4(W-1)^2 + 2B}, \text{ for } T\_c <= L$$

where W is the current window size, B is the number of remaining segments a flow needs to transmit, and L=W/2 (e.g., half the current window size).

The number of remaining segments (B) a flow needs to transmit can be calculated using the following equation:

$$B = \left(\frac{W}{2} + \frac{W}{2} + 1 + \frac{W}{2} + 2 + \ldots \frac{W}{2} + L - 1\right) * \frac{T\_c}{L}$$

Figure 3:
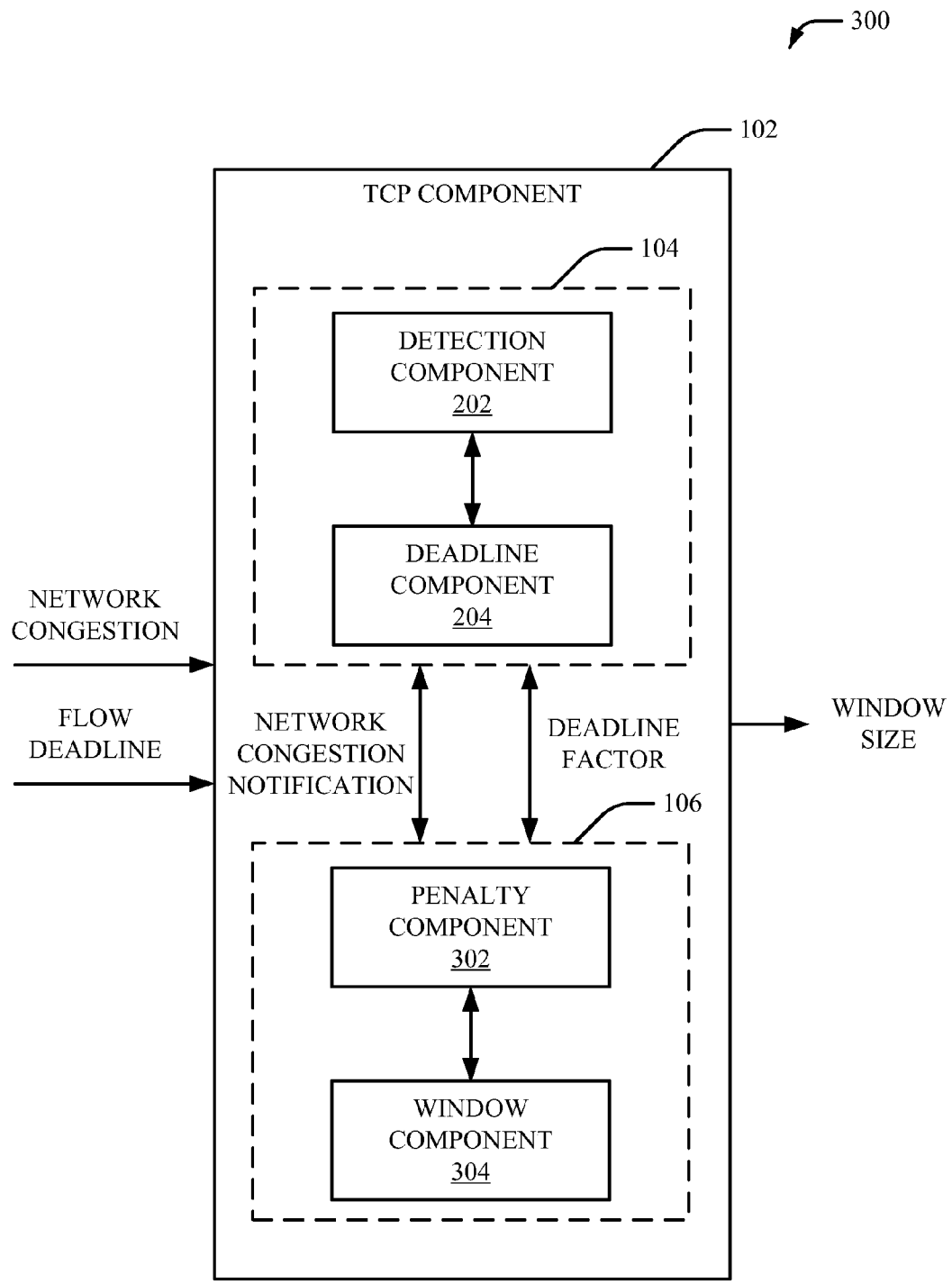
FIG. 3 illustrates a high-level block diagram of a penalty component and a window component in an example TCP component, in accordance with various aspects and implementations described herein.

Referring now to FIG. 3, there is illustrated a non-limiting implementation of a system 300 in accordance with various aspects and implementations of this disclosure. The system 300 includes the TCP component 102. The TCP component 102 includes the congestion detection component 104 and the modification component 106. The congestion detection component 104 includes the detection component 202 and the deadline component 204. The modification component 106 includes a penalty component 302 and a window component 304.

The penalty component 302 can generate a penalty function. The penalty function can be applied to the window size of a flow. For example, a new window size for a flow can be generated by modifying (e.g., scaling) a current window size for the flow based on the penalty function. The value of the penalty function can determine the amount of reduction to the current window size. The penalty component 302 can implement a gamma-correction function to calculate the penalty function.

For example, the penalty function (p) can be calculated using the following equation:

$$p = c^d$$

where c is the degree of congestion determined by the detection component 202 and d is the deadline imminence factor determined by the deadline component 204.

The window component 304 can calculate a new window size for a flow. For example, based on the penalty function, the window component 304 can modify a window size of each flow. For example, the new window size (W_new) for each flow can be calculated using the following equations:

$$W\_new = W * \left(1 - \frac{p}{2}\right), \text{ if } p > 0$$

$$W\_new = W + 1, \text{ if } p > 0$$

Therefore, the new window size can be determined by the window component 304 based on the old window size (e.g., W) and a deadline congestion penalty (e.g., the time remaining for a deadline). If the penalty function is zero and the degree of congestion is zero (e.g., there is no congestion), then the window size for a flow can be modified without the penalty function. For example, if the penalty function is zero and the degree of congestion is zero, then the window size for a flow can be increased by one segment in the next round trip time (RTT).

In one implementation, the deadline based congestion penalty can be determined based on the time remaining for a deadline and congestion history. For example, the penalty component 302 can store congestion penalty data (e.g., in a data store). As such, the penalty component 302 can maintain congestion history and/or determine whether a deadline congestion penalty was recently applied. As such, the penalty component 302 can monitor future network congestion notifications. Therefore, if the congestion in the network increases after applying a penalty function (e.g., other senders and/or receivers in the network become adversely affected), the window size can be reduced.

Figure 4:
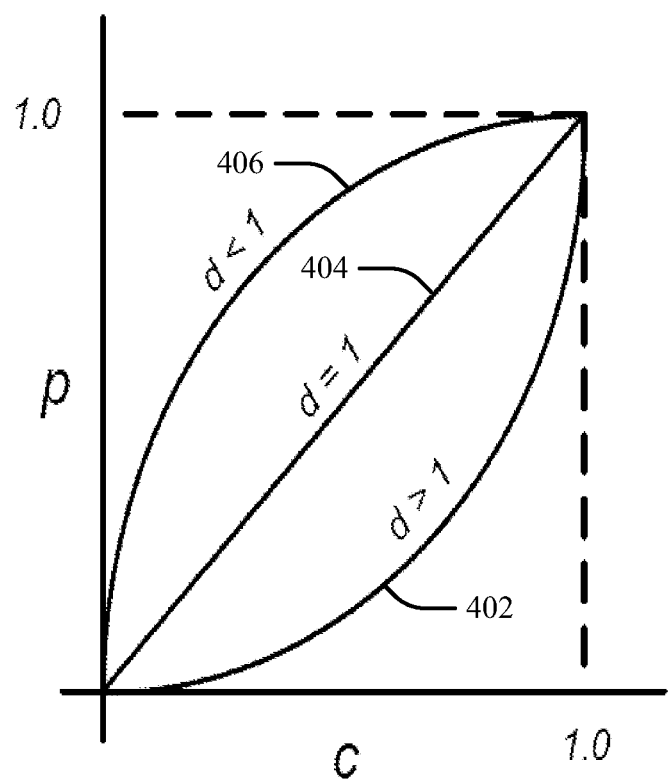
FIG. 4 illustrates a gamma-correction graph for congestion avoidance in a network, in accordance with various aspects and implementations described herein.

Referring to FIG. 4, there is illustrated an example graph 400 illustrating gamma-correction for congestion avoidance in accordance with various aspects and implementations of this disclosure. The graph 400 illustrates the impact of the deadline imminence factor (d) on a window size.

As shown by 402 in FIG. 4, when d>1 (e.g., near-deadline flows), the penalty function (p) gradually increases in response to increases in the degree of congestion (c) until c is approximately equal to 1. When c is approximately equal to 1, p rapidly converges to 1. Therefore, minor (e.g., mild) congestions do not penalize near-deadline flows by a large degree (e.g., the window size is reduced by a small degree). However, severe congestions can penalize near-deadline flows by a large degree (e.g., the window size can is greatly reduced). For example, when c=1 and p=1, the window size can be halved.

As shown by 404 in FIG. 4, when d=1, p is equal to c (e.g., p is directly proportional to c). As such, the window size for each flow can be reduced equally upon congestion regardless of the deadline for each flow. As shown by 406 in FIG. 4, when d<1 (e.g., far-deadline flows), p increases rapidly even with small increase in c and approaches 1 as c approaches 1. Therefore, minor congestions can cause rapid reduction in the window size of a far-deadline flow. However, severe congestions do not greatly penalize the flows.

The combination of d<1 and d>1 behaviors complement each other under congestion situations. Far-deadline flows can reduce network bandwidth so that near-deadline flows can contain greater short-term share in order to meet flow deadlines. As such, the graph 400 (e.g., the TCP component 102) can provide iterative feedback to near-deadline flows so that near-deadline flows do not result in an increased amount of congestion in the network.

Figure 5:
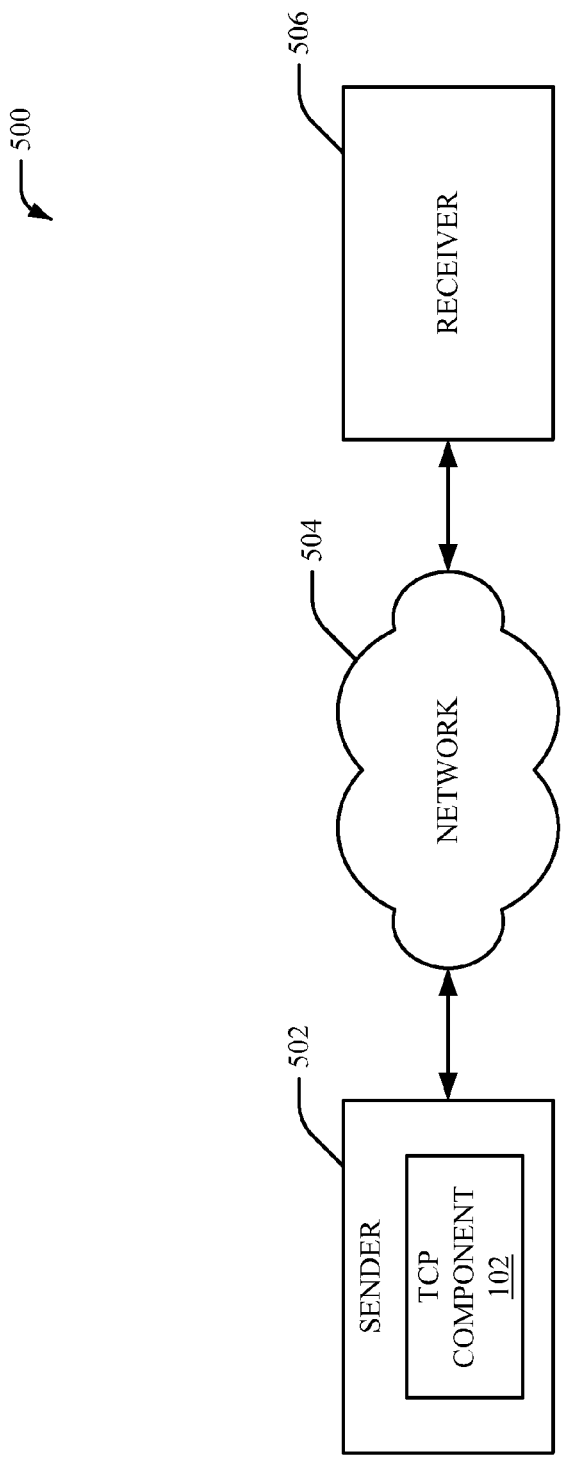
FIG. 5 illustrates an example network system implementing the TCP component, in accordance with various aspects and implementations described herein.

Referring now to FIG. 5, there is illustrated a non-limiting implementation of a system 500 in accordance with various aspects and implementations of this disclosure. The system 500 includes a sender (e.g., a sender device) 502, a network 504 and a receiver (e.g., a receiver device) 506. The sender 502 can include the TCP component 102. In one example, the network 504 can be implemented as a TCP/IP network, such as, but not limited to, an Open Flow network.

The sender 502 (e.g., the TCP component 102) can determine congestion in the network 504 (e.g., congestion between the sender 502 and the receiver 506) and/or receive the current value of D (e.g., the remaining time until a flow deadline). If the sender 502 (e.g., the TCP component 102) does not encounter ECN feedback (e.g., there is no congestion in the network 504), the window size of the sender 502 can be increased by one segment (e.g., using the TCP component 102). Otherwise, the sender 502 (e.g., the TCP component 102) computes c (e.g., the degree of congestion) and T_c (e.g., time for a flow to complete transmitting all of the data) using the current values of D and T_c. The sender 502 (e.g., the TCP component 102) can also compute d (e.g., the deadline imminence factor) based on D and T_c. Furthermore, the sender 502 (e.g., the TCP component 102) can compute p (e.g., the penalty function). As such, the new window size for the sender 502 can be determined based on the computed value of p.

Other aspects of TCP, such as but not limited to, slow start, retransmission and/or timeout when there is a packet loss can remain unchanged when implementing the TCP component 102. When a flow does not include a deadline (e.g., a background flow), the deadline imminence factor d can be set equal to 1 (e.g., d=1).

Figure 6:
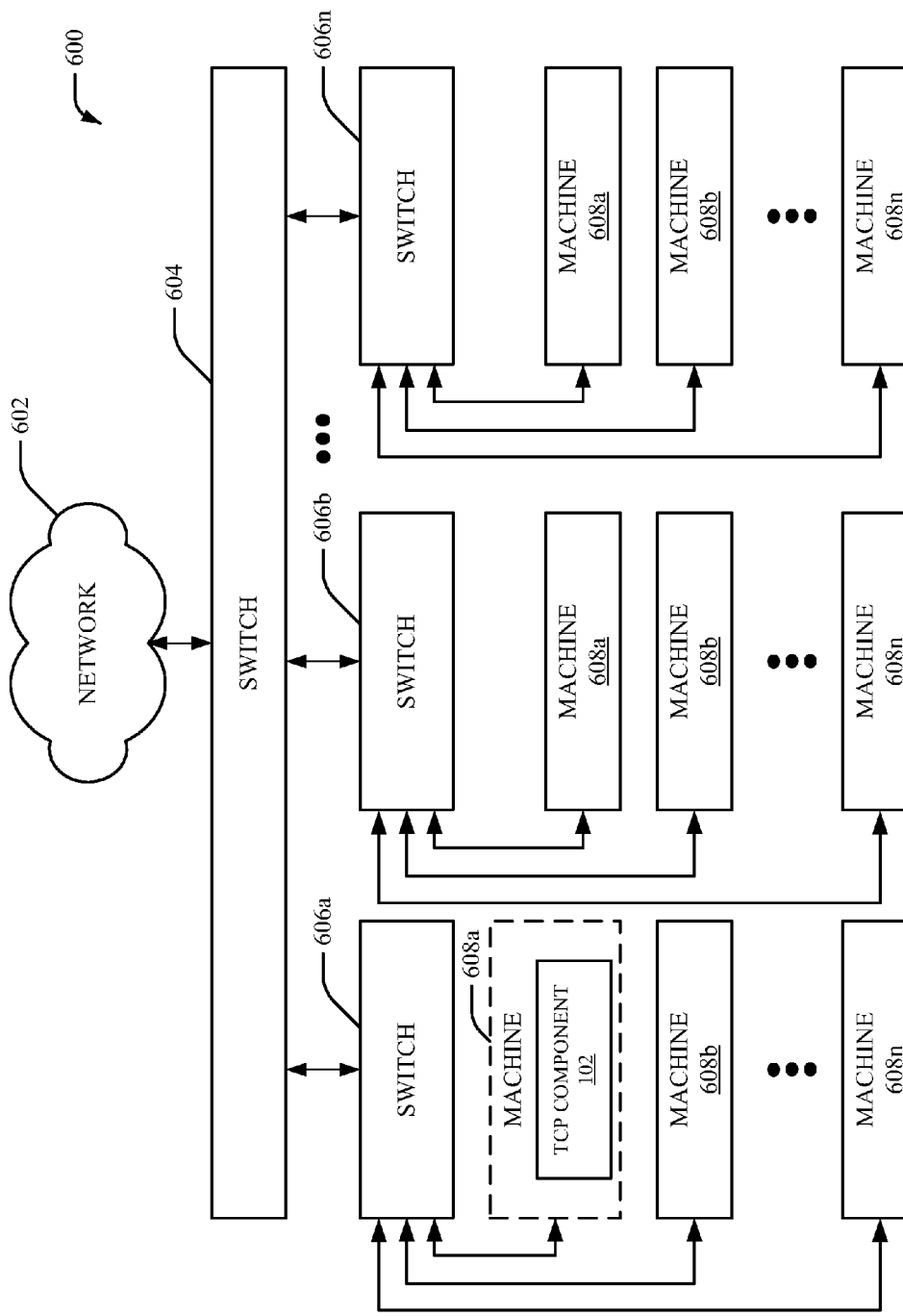
FIG. 6 illustrates an example fat-tree topology network implementing the TCP component, in accordance with various aspects and implementations described herein.

Referring now to FIG. 6, there is illustrated a non-limiting implementation of a system 600 in accordance with various aspects and implementations of this disclosure. The system 600 can implement fat-tree topology. For example, the system 600 can be implemented as a datacenter network implementing a flat-tree topology. The system 600 can also be implemented using a TCP protocol. The system 600 shown in FIG. 6 includes a network 602, a switch 604, one or more switches 606*a-n*, one or more machines 608*a-n*. The one or more machines 608*a-n* can be implemented as end-host machines (e.g., devices in a datacenter, servers, etc.). Each of the one or more switches 606*a-n* can include one or more machines 608*a-n* (e.g., each of the one or more switches 606*a-n* can include one or more unique machines). In one example, the network 602 can be implemented as a TCP/IP network, such as, but not limited to, an Open Flow network.

The switch 604 can be implemented as a fabric switch. The switch 604 can be coupled to the network 602. The network 602 can include one or more fat-tree topology networks and/or other network components. The network can include one or more TCP based applications. The switch 606*a* and the one or more machines 608*a-n* can be implemented together in a server rack (e.g., and the switch 606*b* and the one or more machines 608*a-n*, etc. can be implemented together in a server rack). The switches 606*a-n* can each be implemented as a top-of-rack (ToR) switch. Each of the machines 608*a-n* can include a TCP component 102 (e.g., one or more of the machines 608*a-n* can be implemented as a sender and/or one or more of the machines 608*a-n* can be implemented as a receiver). As such, prioritization of traffic in the system 600 can be based on congestion in the system 600 and deadlines in the system 600 (e.g., deadlines of flows for the machines 608*a-n*). It is to be appreciated that the present invention is not limited to the network type shown in FIG. 6. The TCP component 102 can be implemented in most any network type that includes a sender device and/or a receiver device.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 7-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 7:
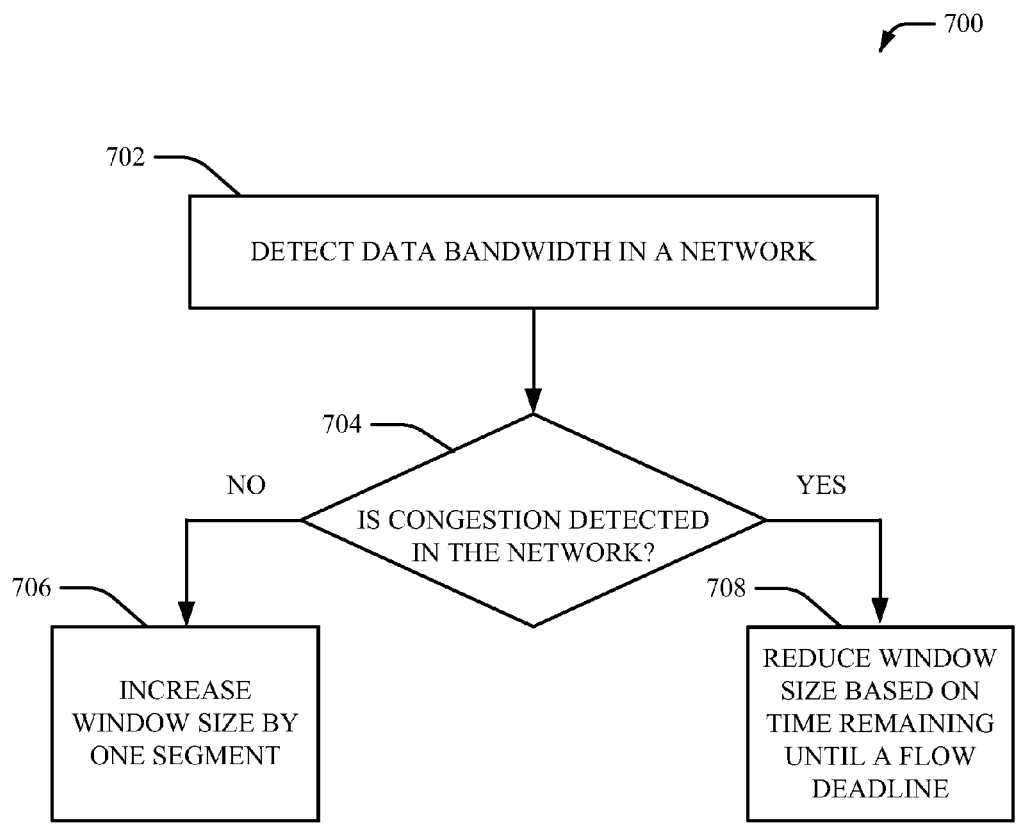
FIG. 7 depicts a flow diagram of an example method for modulating a TCP window size in a deadline-aware manner, in accordance with various aspects and implementations described herein.

Referring to FIG. 7, there illustrated is a methodology 700 for modulating window size based on congestion and a deadline, according to an aspect of the subject innovation. As an example, methodology 700 can be utilized in various applications, such as, but not limited to, data center systems, network systems, computer network systems, communication systems, router systems, server systems, high availability server systems (e.g., Telecom server systems), Web server systems, file server systems, media server systems, disk array systems, powered insertion board systems, etc. Specifically, the methodology 700 can vary the degree of modulation of a window size based on the time remaining until a flow deadline.

At 702, data bandwidth in a network can be detected (e.g., by a detection component 202). For example, network congestion can be implicitly inferred by detecting packet loss. In another example, an explicit congestion notification can be received (e.g., from a switch coupled to the TCP component 102). At 704, it can be determined (e.g., by a detection component 202) whether congestion is detected in the network. If no, at 706, the window size can be increased (e.g., by a modification component 106) by one segment. For example, the window size can be increased by a predefined amount. If yes, at 708, the window size can be reduced (e.g., by a modification component 106) based on time remaining until a flow deadline. For example, the window size can be reduced by an amount that is proportional to the time remaining until a flow deadline.

Figure 8:
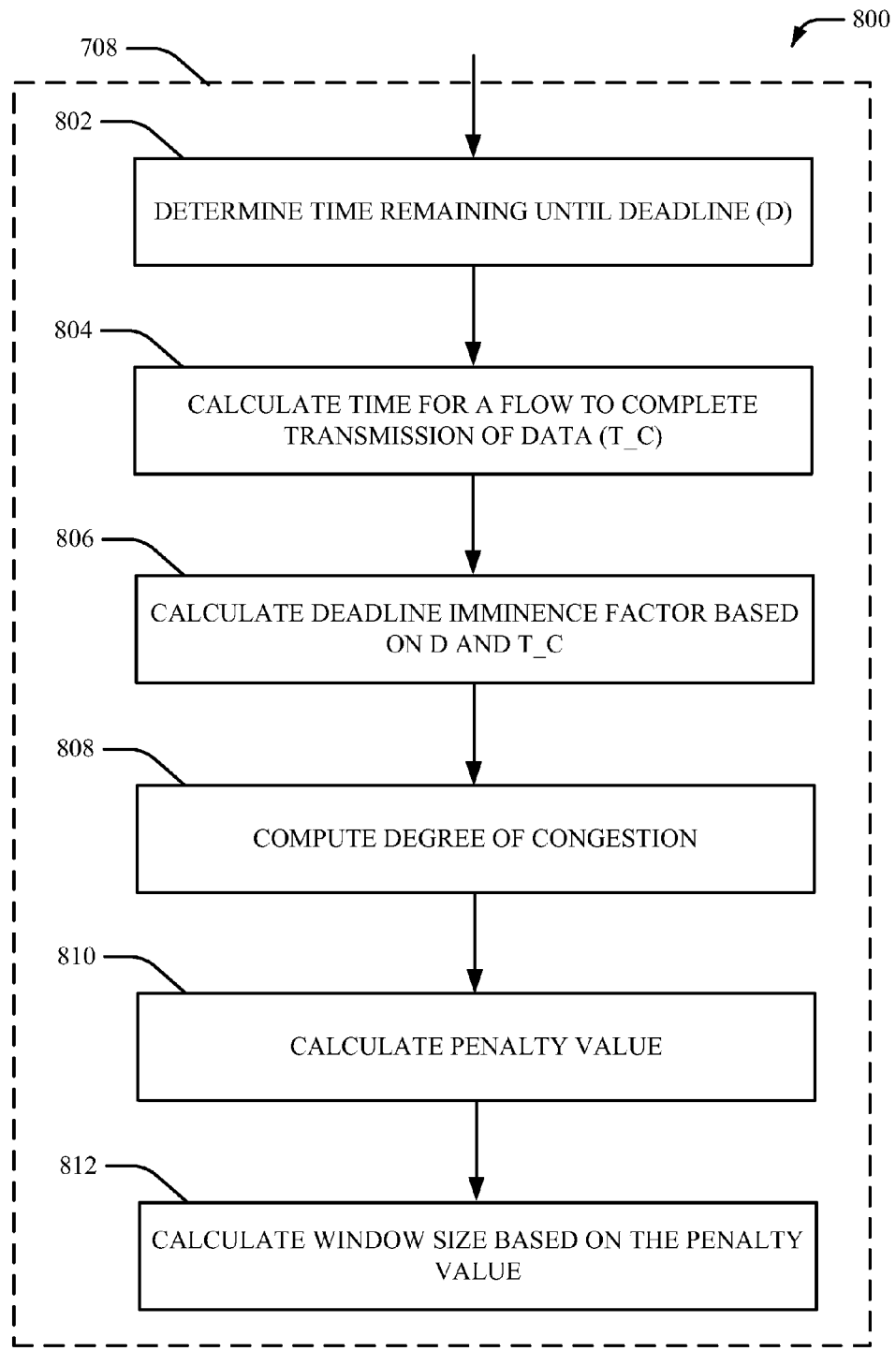
FIG. 8 depicts a flow diagram of an example method for modifying a TCP window size based on a flow deadline, in accordance with various aspects and implementations described herein.

Referring to FIG. 8, there illustrated is another example methodology 800 for modifying a window size. The methodology 800 can provide further details for 708. At 802, time remaining until a deadline can be determined (e.g., by a detection component 202). For example, time remaining until a flow deadline (D) can be determined via the FLOW DEADLINE signal shown in FIGS. 1-3. At 804, time for a flow to complete transmission of data can be calculated (e.g., by a detection component 202). For example, time for a flow to complete transmission of data (T_c) can be determined based on the number of remaining segments a flow needs to transmit and/or a current window size. At 806, a deadline imminence factor can be calculated (e.g., by a deadline component 204) based on the time remaining until a deadline and the time for a flow to complete transmission of data. For example, a larger deadline imminence factor (d) can imply a closer deadline. At 808, degree of congestion can be computed (e.g., by a detection component 202). For example, the degree of congestion (c) can be computed based on ECN feedback (e.g., ECN bits set in a TCP header). At 810, a penalty value can be calculated (e.g., by a penalty component 302). For example, the penalty value (p) can be calculated based on the degree of congestion in the network (c) and the deadline imminence factor (d). At 812, window size can be calculated (e.g., by a window component 304) based on the penalty value. For example, a new window size can be determined based on the old window size and the penalty value (e.g., the penalty value can scale the old window size to generate a new window size).

Figure 9:
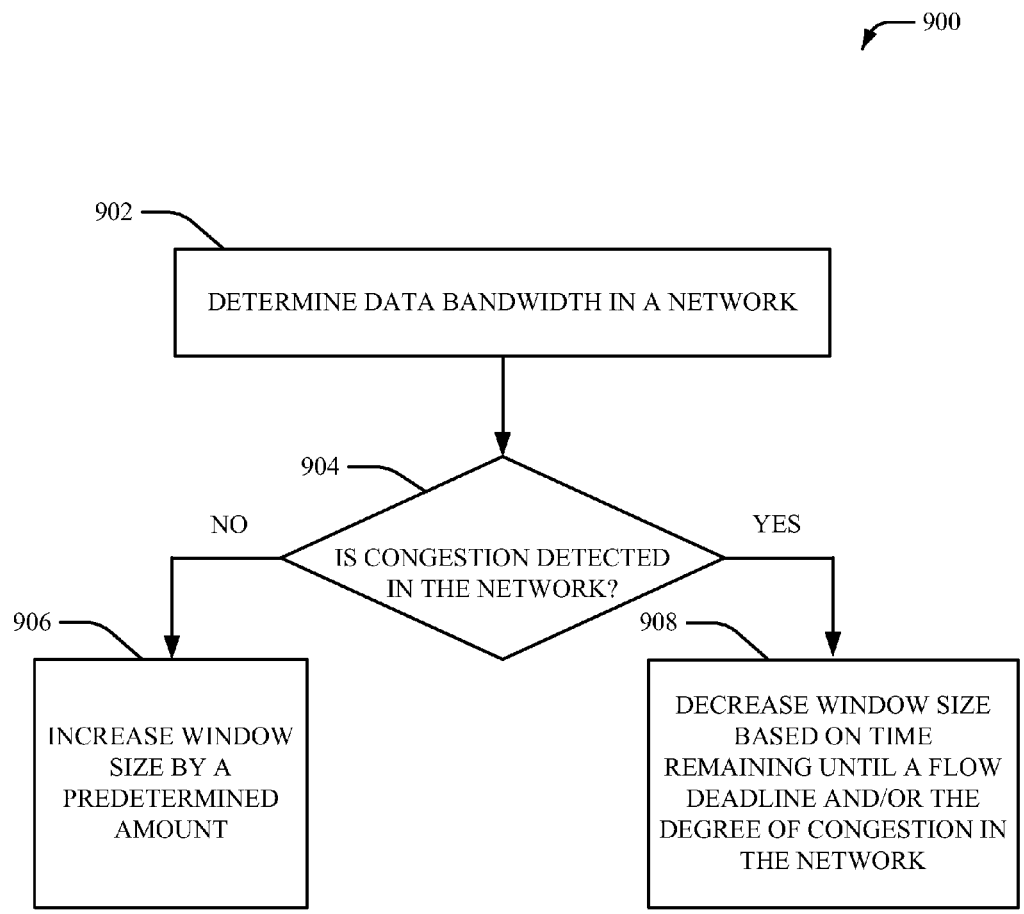
FIG. 9 depicts a flow diagram of another example method for modulating a TCP window size in a deadline-aware manner, in accordance with various aspects and implementations described herein.

Referring to FIG. 9, there illustrated is another example methodology 900 for modifying a window size. At 902, data bandwidth in a network can be determined (e.g., by a detection component 202). For example, data bandwidth (e.g., network congestion) can be determined by detecting packet loss. In another example, a congestion notification can be received (e.g., generated by a switch) in response to detected network congestion. At 904, it can be determined (e.g., by a detection component 202) whether congestion is detected in the network. If no, at 906, the window size can be increased (e.g., by a modification component 106) by a predetermined amount. For example, the window size can be increased by one segment. If yes, at 908, the window size can be decreased (e.g., by a window component 304) based on time remaining until a flow deadline and/or the degree of congestion in the network. For example, the window size can be reduced by an amount that is proportional to the time remaining until a flow deadline and/or the amount of congestion in the network.

Figure 10:
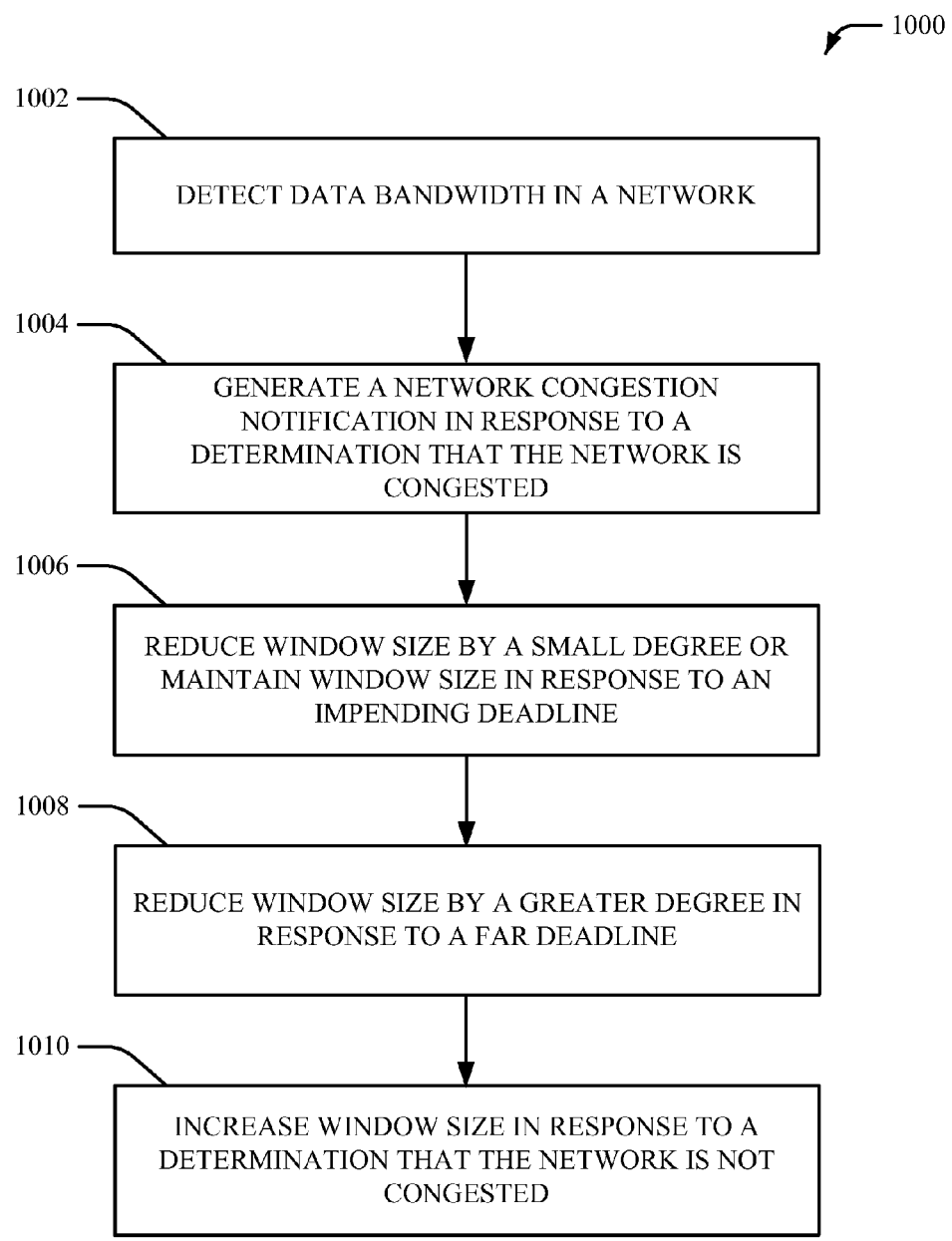
FIG. 10 depicts a flow diagram of an example method for prioritizing network traffic based on a deadline, in accordance with various aspects and implementations described herein.

Referring to FIG. 10, there illustrated is a methodology 1000 for prioritizing network traffic based on a deadline. At 1002, data bandwidth can be detected (e.g., by a detection component 202) in a network. For example, the data bandwidth in the network can be constantly monitored by the detection component 202. At 1004, a network congestion notification can be generated (e.g., by a detection component 202) in response to a determination that the network is congested. For example, the network congestion notification can include the degree of congestion in the network. At 1006, the window size can be reduced (e.g., by a window component 304) by a small degree or the window size can be maintained in response to an impending deadline. For example, a TCP window size can be reduced by an amount that is proportional to the time remaining until a flow deadline. At 1008, window size can be reduced (e.g., by a window component 304) by a greater degree in response to a far deadline. For example, a TCP window size can be reduced by a greater amount in response to a deadline that is not impending. At 1010, window size can be increased (e.g., by a window component 304) in response to a determination that the network is not congested. For example, a TCP window size can be increased by a predetermined amount in response to a determination that the network is not congested.

Figure 11:
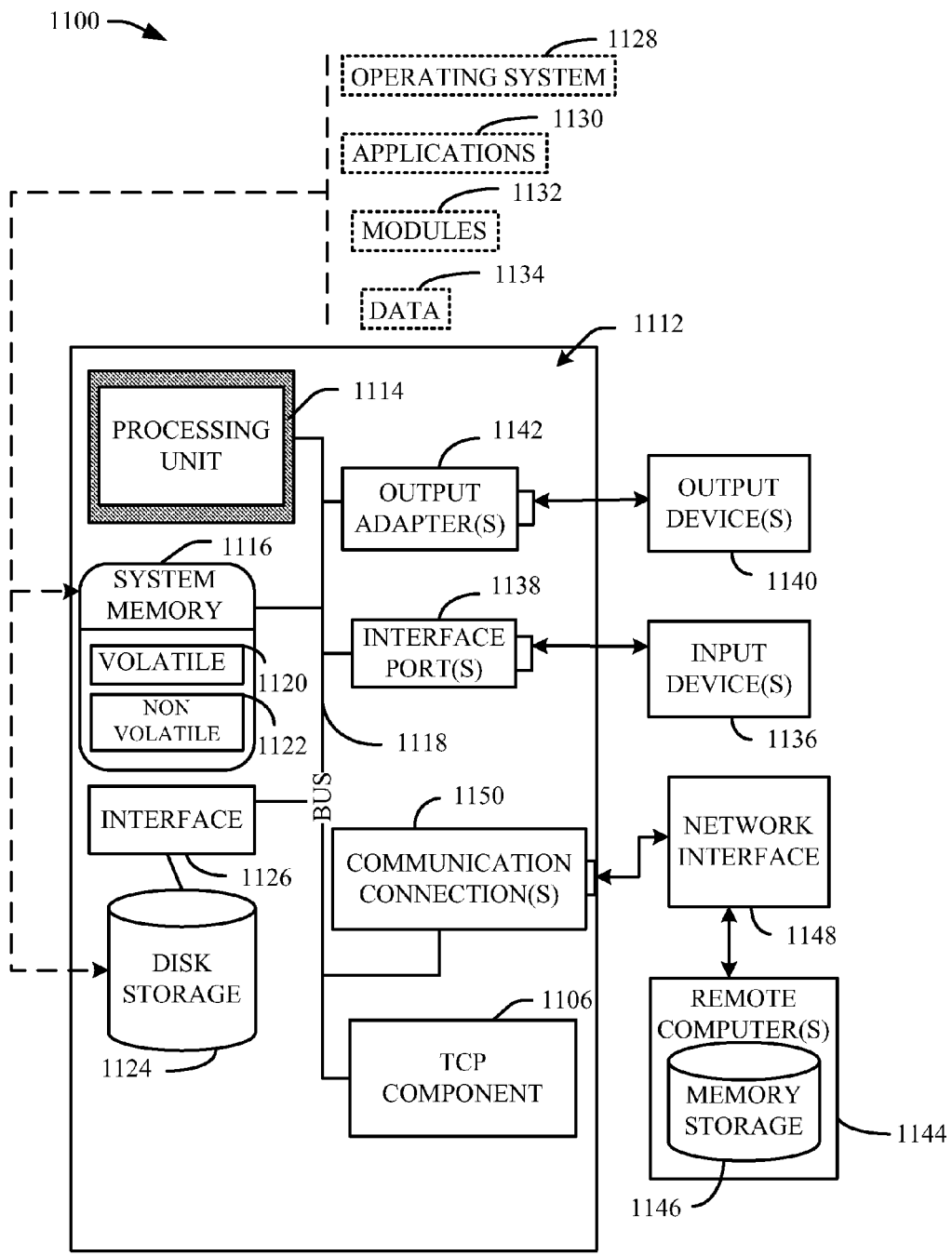
FIG. 11 is a schematic block diagram illustrating a suitable operating environment.
Figure 12:
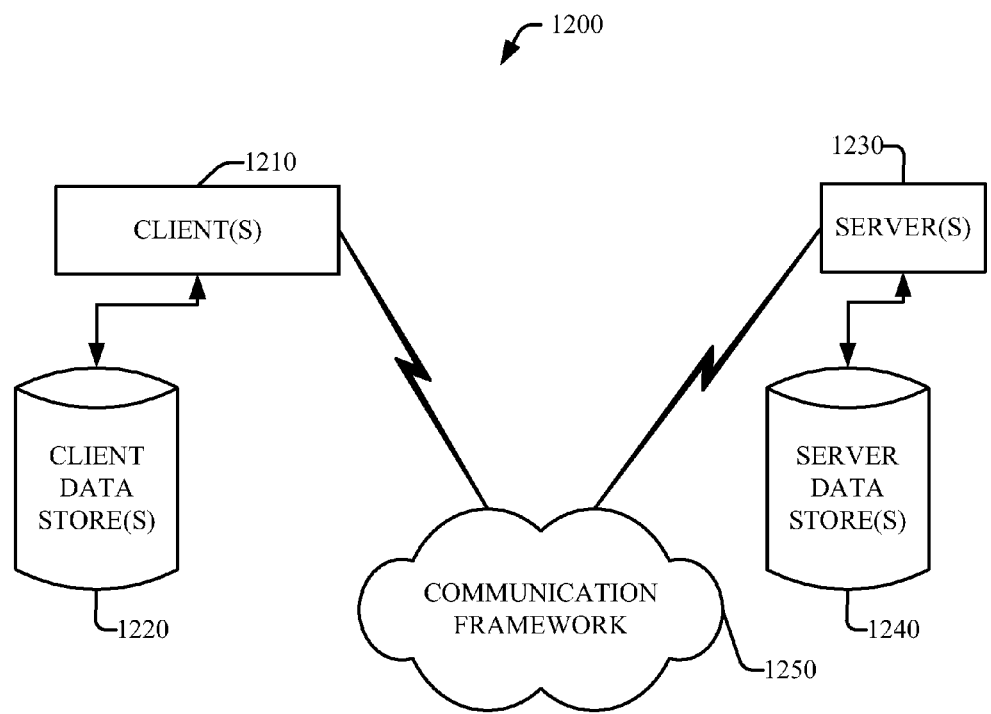
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

It is to be appreciated that the computer 1112 can be used in connection with implementing one or more of the systems or components shown and described in connection with FIGS. 1-3, 5 and 6. In accordance with various aspects and implementations, the computer 1112 can be used to implement a deadline-aware TCP network. In certain exemplary embodiments, the computer 1112 includes a TCP component 1106 (e.g., the TCP component 102) that can contain, for example, a congestion detection component 104, a modification component 106, a detection component 202, a deadline component 204, a penalty component 302 and/or a window component 304, each of which can respectively function as more fully disclosed herein.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., TCP component, congestion detection component, modification component, detection component, deadline component, penalty component, window component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system comprising:
    a non-transitory memory storing computer executable instructions; and
    a processor configured to execute the computer executable instructions stored in the memory, wherein the instructions, when executed by the processor, cause the processor to:
        detect data bandwidth in a network; and
        modify a transmission control protocol (TCP) window size, wherein the TCP window size is reduced in response to congestion in the network by a modification amount that is based on a network congestion history and a time remaining until a flow deadline.

2. The system of claim 1, wherein the modification amount is further based on a degree of the congestion in the network.

3. The system of claim 1, wherein the modification amount is further based on a penalty value.

4. The system of claim 1, wherein the instructions to modify the TCP window size increase the TCP window size by a predetermined amount in response to no congestion in the network.

5. The system of claim 1, wherein the data bandwidth is detected based on an explicit congestion notification.

6. The system of claim 1, wherein the instructions further comprise instructions to store congestion penalty data in response to a generated network congestion notification.

7. A system comprising:
    a non-transitory memory storing computer executable instructions; and
    a processor configured to execute the computer executable instructions stored in the memory, wherein the instructions, when executed by the processor, cause the processor to:
        detect data bandwidth in a network; and
        modify a transmission control protocol (TCP) window size, wherein the TCP window size is reduced in response to congestion in the network by a modification amount that is proportional to the time remaining until the flow deadline.

8. The system of claim 7, wherein the modification amount is adjusted based on a degree of the congestion in the network.

9. The system of claim 7, wherein the modification amount is adjusted based on a penalty value.

10. The system of claim 7, wherein the instructions to modify the TCP window size increase the TCP window size by a predetermined amount in response to no congestion in the network.

11. The system of claim 7, wherein the data bandwidth is detected based on an explicit congestion notification.

12. A method, comprising;
    employing a processor that facilitates execution of computer executable instructions stored on a non-transitory computer readable medium to implement operations, comprising:
        detecting data bandwidth in a network;
        reducing a transmission control protocol (TCP) window size in response to congestion in the network, wherein a degree of reduction of the TCP window size is based on a network congestion history and a time remaining until a flow deadline; and
        increasing the TCP window size in response to no congestion in the network.

13. The method of claim 12, wherein the increasing includes increasing the TCP window size by a predetermined amount.

14. The method of claim 12, further comprising constantly monitoring the data bandwidth in the network.

15. The method of claim 12, further comprising determining the time remaining until the flow deadline.

16. The method of claim 12, further comprising determining a degree of congestion to determine the degree of reduction of the TCP window size.

17. The method of claim 12, wherein the detecting includes receiving explicit congestion notification feedback from a TCP header.

18. A method comprising:
    detecting, by a congestion detection component executing on a computer processor, data bandwidth in a network; and
    reducing, by a modification component executing on the computer processor, a transmission control protocol (TCP) window size in response to congestion in the network, wherein the reducing includes reducing the TCP window size by a modification amount that is proportional to a time remaining until a flow deadline.

19. The method of claim 18, further comprising determining the time remaining until the flow deadline.

20. The method of claim 18, wherein detecting includes receiving explicit congestion notification feedback from a TCP header.

21. The method of claim 18, further comprising reducing the TCP window size by a second amount, in addition to the modification amount, where the second amount is based on a degree of the congestion in the network.

22. The method of claim 18, further comprising reducing the TCP window size by a second amount, in addition to the modification amount, where the second amount is based on a penalty value.

23. The method of claim 18, further comprising increasing the TCP window size by a predetermined amount in response to no congestion in the network.

* * * * *